US007296046B2

(12) United States Patent
Ono (10) Patent No.: US 7,296,046 B2
(45) Date of Patent: Nov. 13, 2007

(54) MOBILE TERMINAL PROVIDED WITH POSITIONING SYSTEM AND METHOD OF POSITIONING

(75) Inventor: Hiroshi Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 652 days.

(21) Appl. No.: 10/765,125

(22) Filed: Jan. 28, 2004

(65) Prior Publication Data

US 2004/0267840 A1    Dec. 30, 2004

(30) Foreign Application Priority Data

Jan. 28, 2003    (JP)    ............................. 2003-018708

(51) Int. Cl.
*G06F 7/38*    (2006.01)
(52) U.S. Cl. ..................................... 708/445
(58) Field of Classification Search ................ 708/200, 708/445
See application file for complete search history.

(56) References Cited

U.S. PATENT DOCUMENTS

| 6,097,959 A | 8/2000 | Yost et al. |
| 6,366,854 B1 | 4/2002 | Tsuchiya et al. |
| 2002/0132626 A1 | 9/2002 | Tsunehara et al. |
| 2003/0050077 A1 * | 3/2003 | Takeuchi et al. ............ 455/456 |

FOREIGN PATENT DOCUMENTS

| EP | 1 102 397 A2 | 5/2001 |
| JP | 2001-333445 | 11/2001 |
| JP | 2001-339755 | 12/2001 |
| JP | 2002-281540 | 9/2002 |
| JP | 2002-296339 | 10/2002 |

OTHER PUBLICATIONS

Patent Abstracts of Japan, vol. 2002, No. 03, 2002 (JP 2001 333445A), Abstract only.

* cited by examiner

*Primary Examiner*—Tan V. Mai
(74) *Attorney, Agent, or Firm*—Foley & Lardner LLP

(57) ABSTRACT

A mobile terminal which has a positioning function, a positioning method and a positioning system for implementing positioning with plural processes and selecting an optimum process by which positioning can be executed with the least error in positioning accuracy. A positioning method applied to a mobile terminal which is provided with a positioning function, wherein a positioning result is obtained by selectively using a first calculation process for finding out a weighted average value from the results of two or more latest positioning calculations each time a measurement has been made based on the results of a plurality of positioning calculations, and a second calculation process for finding out a weighted average value by adding the latest positioning result as a calculation factor to the weighted average of past positioning results each time a measurement has been made based on the results of a plurality of positioning calculations.

20 Claims, 11 Drawing Sheets

MOBILE TERMINAL PROVIDED WITH POSITIONING SYSTEM AND METHOD OF POSITIONING

FIELD OF THE INVENTION

The present invention relates to a mobile terminal provided with a positioning function and a positioning method.

BACKGROUND OF THE INVENTION

In conventional positioning systems, whether to perform the process with respect to averaged results of a plurality of positioning calculations or to perform the process with respect to a result of a single positioning calculation is determined according to the setting as described in, for example, Japanese Patent Application laid open No. 2001-333445 and Japanese Patent Application laid open No. 2001-339755.

Besides, in the case where accuracy is required of positioning, the averaging process is carried out as described in, for example, Japanese Patent Application laid open No. 2002-281540 and Japanese Patent Application laid open No. 2002-296339.

Figure 1:
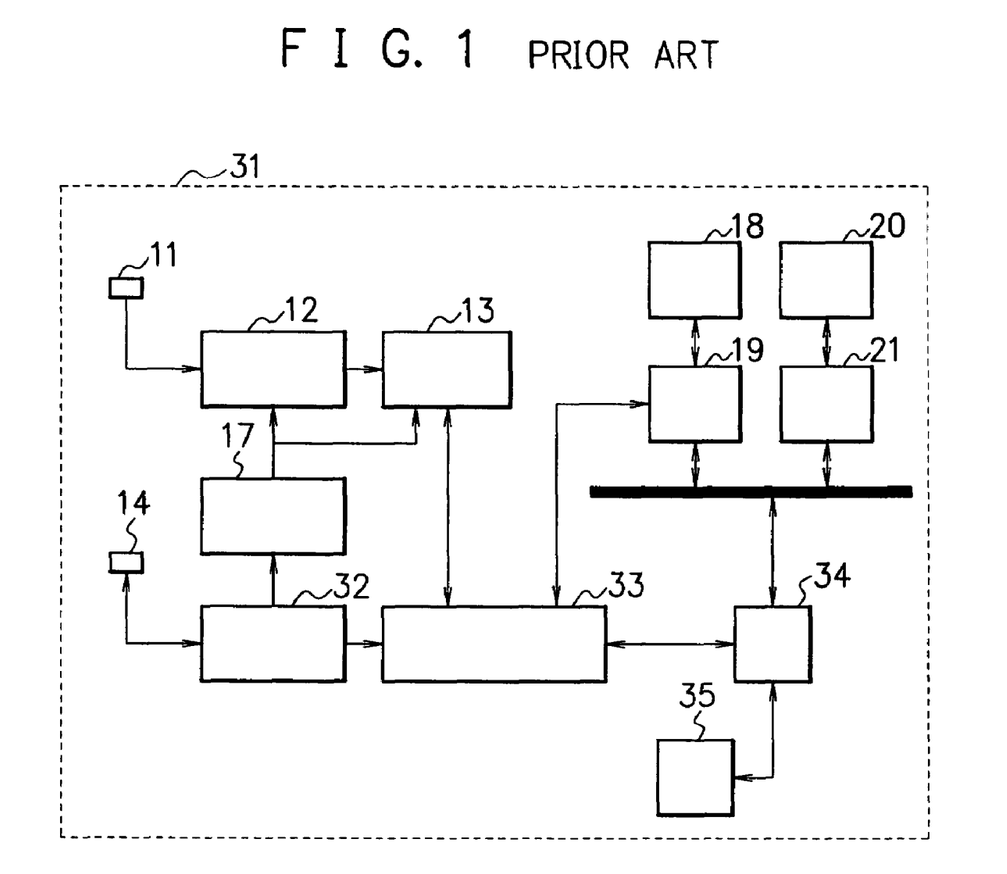
FIG. 1 is a block diagram showing the configuration of a conventional GPS mobile phone unit.

FIG. 1 is a block diagram showing the configuration of a conventional mobile phone unit provided with a GPS (Global Positioning System). With reference to FIG. 1, a description will be made of the configuration of a conventional GPS mobile phone unit.

As can be seen in FIG. 1, a GPS mobile phone unit 31 comprises a GPS antenna 11 for receiving GPS signals, a GPS radio section 12 for demodulating the GPS signals, a GPS decryption section 13 for decrypting the GPS signals, a two-way transmission antenna 14 for transmitting/receiving radio signals of a mobile phone system, a frequency supply block 17, a mobile phone radio section 32 for modulating/demodulating the radio signals, a system processing section 33 for performing the processing of mobile phone signals and the processing of GPS signals, a voice input/output section 18, a voice processing section 19, a display 20, a display processing section 21, a CPU 34 for executing overall processing, and a real time clock (RTC) 35 for executing the time of day control of the GPS mobile phone unit 3.

Figure 2:
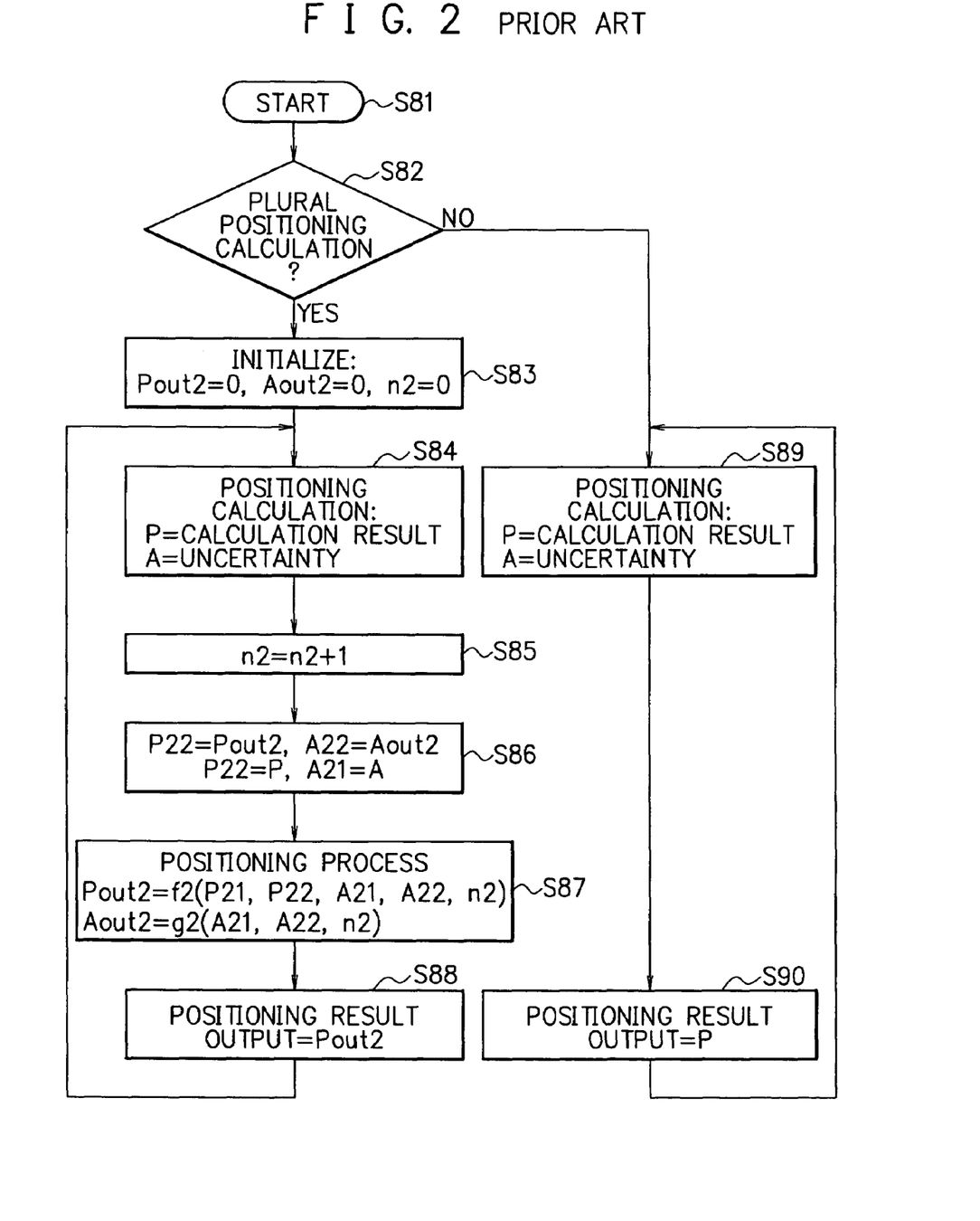
FIG. 2 is a flowchart showing the positioning operation carried out by the GPS mobile phone unit shown in FIG. 1.

FIG. 2 is a flowchart showing the positioning operation carried out by the GPS mobile phone unit 31 shown in FIG. 1.

When the positioning operation starts (step S81), the system processing section 33 determines whether to perform the process with respect to averaged results of a plurality of positioning calculations or to perform the process with respect to a result of a single positioning calculation (step S82). The system processing section 33 makes a decision on the process to be carried out based on predetermined settings.

When the process with respect to averaged results of a plurality of positioning calculations is performed, after the initialization process (step S83) and positioning calculation (step S84), the positioning process including the averaging process is implemented (steps S85 to S88).

When the process is performed using a result of a single calculation, after positioning calculation (step S89), a positioning result is output (step S90).

In the aforementioned conventional system, a decision as to whether to perform the process with respect to averaged results of a plurality of positioning calculations or to perform the process with respect to a result of a single positioning calculation is made according to predetermined settings regardless of the state of the mobile phone unit. Consequently, an optimum calculation result cannot be obtained.

In addition, for example, if the averaging process is simply carried out in the case of positioning which requires accuracy, an error occurs due to the averaging when the mobile phone unit is in transit. However, if the averaging process is performed on the ground that the mobile phone unit is in transit, it takes extra time to carry out positioning calculations, and, therefore, previous location information which has already been obtained is used as the output of a positioning result.

On the other hand, when employing a result of a single positioning calculation, a notification of positioning failure is given in situations that the rate of successful positioning is low, and a utility sphere or area is restricted.

SUMMARY OF THE INVENTION

It is therefore an object of the present invention, in order to overcome the above-described problems in conventional techniques, to provide a positioning method and a mobile terminal that has a positioning function for implementing positioning by plural processes and is capable of selecting an optimum process by which positioning can be executed with the least error in positioning accuracy.

It is another object of the present invention to provide a positioning method and a mobile terminal for figuring out the state of the mobile terminal more precisely so as to select an optimum process from the plural processes.

It is yet another object of the present invention to provide a positioning method and a mobile terminal for offering a positioning result with a higher degree of accuracy at a low price.

In accordance with the first aspect of the present invention, to achieve the above objects, there is provided a positioning method applied to a mobile terminal having a positioning function, wherein a positioning result is obtained by selectively using:

data obtained by a positioning calculation;

data obtained by a first calculation process for finding out a weighted average value from the results of two or more latest positioning calculations based on a plurality of positioning calculations; or data obtained by a second calculation process for finding out a weighted average value by adding the result of the latest positioning calculation as a calculation factor to the weighted average of past positioning calculation results based on a plurality of positioning calculations.

In accordance with the second aspect of the present invention, in the positioning method of the first aspect, one of the data is selected based on an application running on the mobile terminal.

In accordance with the third aspect of the present invention, in the positioning method of the first aspect, one of the data is selected based on the traveling speed of the mobile terminal.

In accordance with the fourth aspect of the present invention, in the positioning method of the first aspect, one of the data is selected based on the state of the mobile terminal determined by comparing the clock speed of a fixed position with the clock speed of the mobile terminal.

In accordance with the fifth aspect of the present invention, in the positioning method of one of the first to fourth aspects, positioning operation is continued based on a decision as to whether or not to change the calculation process when the traveling speed of the mobile terminal has changed after selecting one of the data.

In accordance with the sixth aspect of the present invention, in the positioning method of the first aspect, positioning is started with the initialization process.

In accordance with the seventh aspect of the present invention, there is provided a mobile terminal with a positioning function, which obtains a positioning result by selectively using:

data obtained by a positioning calculation;

data obtained by a first calculation process for finding out a weighted average value from the results of two or more latest positioning calculations based on a plurality of positioning calculations; or data obtained by a second calculation process for finding out a weighted average value by adding the result of the latest positioning calculation as a calculation factor to the weighted average of past positioning calculation results based on a plurality of positioning calculations.

In accordance with the eighth aspect of the present invention, in the mobile terminal of the seventh aspect, one of the data is selected based on an application running on the mobile terminal.

In accordance with the ninth aspect of the present invention, in the mobile terminal of the seventh aspect, one of the data is selected based on the traveling speed of the mobile terminal.

In accordance with the tenth aspect of the present invention, there is provided a mobile terminal with a positioning function, comprising a first clock, a second clock and a counter for determining the state and/or traveling speed of the mobile terminal, which obtains a positioning result by selectively using:

data obtained by a positioning calculation;

data obtained by a first calculation process for finding out a weighted average value from the results of two or more latest positioning calculations based on a plurality of positioning calculations; or data obtained by a second calculation process for finding out a weighted average value by adding the result of the latest positioning calculation as a calculation factor to the weighted average of past positioning calculation results based on a plurality of positioning calculations;

wherein one of the data is selected based on the state and/or traveling speed of the mobile terminal determined from the difference between a first clock value and a second clock value obtained by the first clock, the second clock and the counter.

In accordance with the eleventh aspect of the present invention, in the mobile terminal of the tenth aspect, the first clock value is determined based on a clock pulse that occurs at a fixed position.

In accordance with the twelfth aspect of the present invention, in the mobile terminal of the tenth aspect, the first clock value is determined based on a clock pulse generated by the clock of a mobile terminal network.

In accordance with the thirteenth aspect of the present invention, there is provided a positioning system including the mobile terminal in one of the seventh to twelfth aspects, comprising:

a plurality of signal sources for providing the mobile terminal with signals used to carry out positioning calculations; and a reference clock source for providing the mobile terminal with a clock signal used to determine the state and/or traveling speed of the mobile terminal;

wherein the mobile terminal determine the state and/or traveling speed of the mobile terminal using a reference clock value which has been determined based on the clock signal fed by the reference clock source, and selects one of calculation processes to obtain a positioning result based on the state and/or traveling speed of the mobile terminal.

In accordance with the fourteenth aspect of the present invention, in the positioning system of the thirteenth aspect, the plurality of signal sources are GPS satellites.

In accordance with the fifteenth aspect of the present invention, in the positioning system of the thirteenth aspect, the signals for carrying out positioning calculations are signals transmitted and received by the mobile terminal in a mobile terminal network.

In accordance with the sixteenth aspect of the present invention, in the positioning system of the fourteenth or fifteenth aspect, the reference clock source generates clock signals in a fixed position.

A mobile terminal having a positioning function such as a GPS (Global Positioning System) according to the present invention is characterized in that the most appropriate calculation process is selected for positioning according to the state of the mobile terminal, and the selected process is performed based on the results of a plurality of positioning calculations. Thus, positioning accuracy can be improved.

At the present day, positioning is performed by using a GPS, the arrival time of received/transmitted signals in a mobile phone system or the like. Besides, there are some methods for the GPS positioning such as the single positioning method and the server assist method. According to the single positioning method, a mobile terminal carries out positioning independently. On the other hand, according to the server assist method, a server connected to a network transmits messages from GPS satellites to a mobile terminal, and the mobile terminal carries out positioning calculations based on the messages. In accordance with the present invention, the results of a plurality of positioning calculations each containing an error are weighted based on information as to the degree of accuracy, respectively, and then averaged to obtain a positioning result. There are a plurality of calculation processes or ways to obtain the positioning result, and one of them is selected depending on the application which is currently running on a mobile terminal or the state of the mobile terminal. The state of the mobile terminal is detected by comparison with a past positioning result or a change in a synchronization frequency between the mobile terminal and a mobile phone network.

While the GPS will be taken as an example to illustrate embodiments of the present invention, the present invention can be applied to other systems. For example, the same is true in the case where positioning is performed making use of the arrival time of received or transmitted signals in a mobile phone system.

As described above, in a mobile terminal having a positioning function according to the present invention, the state of the mobile terminal is monitored to select and change an optimum calculation process for positioning. Thereby, it is possible to provide a positioning result with a high degree of accuracy at no increase in cost.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the drawings, a description of preferred embodiments of the present invention will be given in detail.

Figure 3:
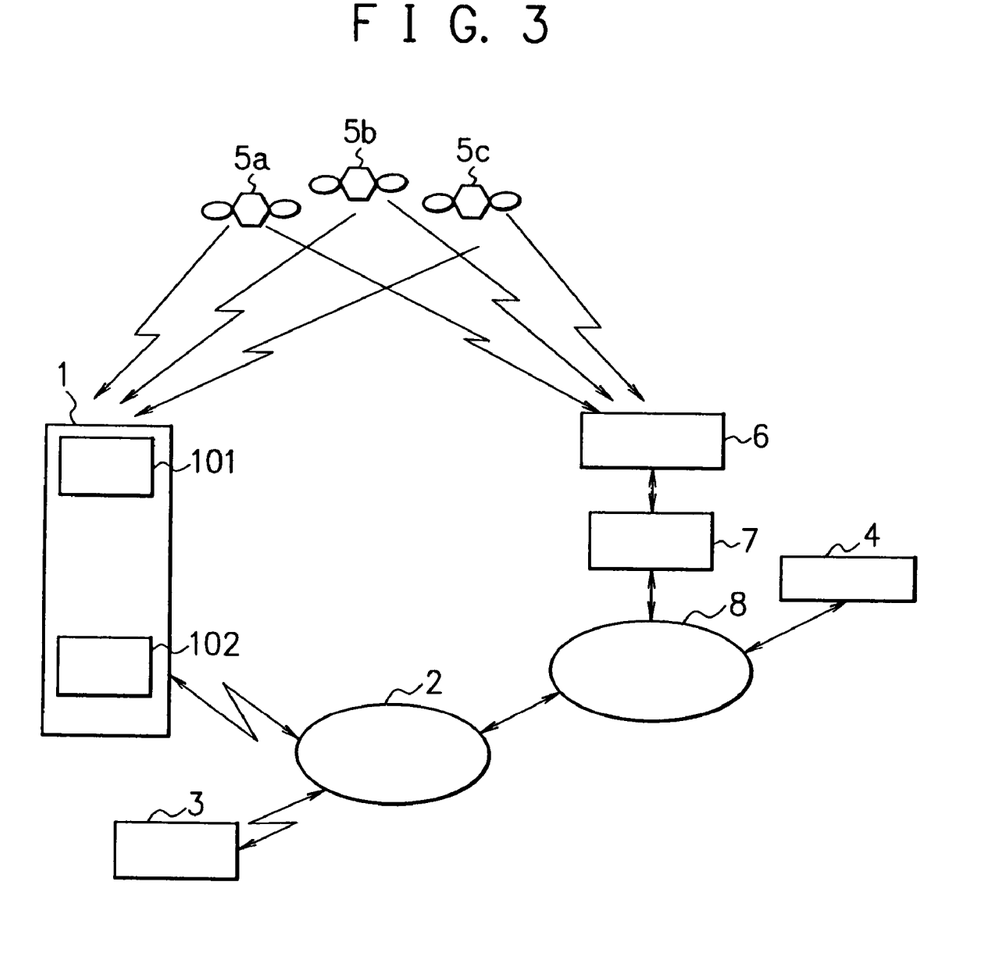
FIG. 3 is a block diagram showing the configuration of a mobile phone system utilizing a positioning function according to the present invention.

FIG. 3 is a block diagram showing the configuration of a mobile phone system having a positioning function according to an embodiment of the present invention.

As can be seen in FIG. 3, the mobile phone system comprises a GPS mobile phone unit 1, a mobile phone network 2, a mobile phone unit 3, a server 4, GPS satellites 5a to 5c, a GPS standard receiver 6, a GPS server 7 and the Internet 8. The GPS mobile phone unit 1 includes a built-in GPS receiver 101 and a built-in radio communication section 102.

The GPS receiver 101 of the GPS mobile phone unit 1 intermittently receives signals from the GPS satellites 5a to 5c. The GPS standard receiver 6 connected to the GPS server 7 receives data from the GPS satellites 5a to 5c all the time.

The radio communication section 102 of the GPS mobile phone unit 1 can be connected to the mobile phone network 2 by radio. The radio communication section 102 achieves data communications with the server 4 and the GPS server 7 connected with the Internet 8.

According to the single positioning method, the GPS mobile phone unit 1 analyzes the signals received from the GPS satellites 5a to 5c to carry out positioning calculations. Besides, according to the server assist method, the GPS mobile phone unit 1 holds data communications with the GPS server 7 in advance to receive necessary information for positioning, and analyzes the signals received from the GPS satellites 5a to 5c to carry out positioning calculations.

Figure 4:
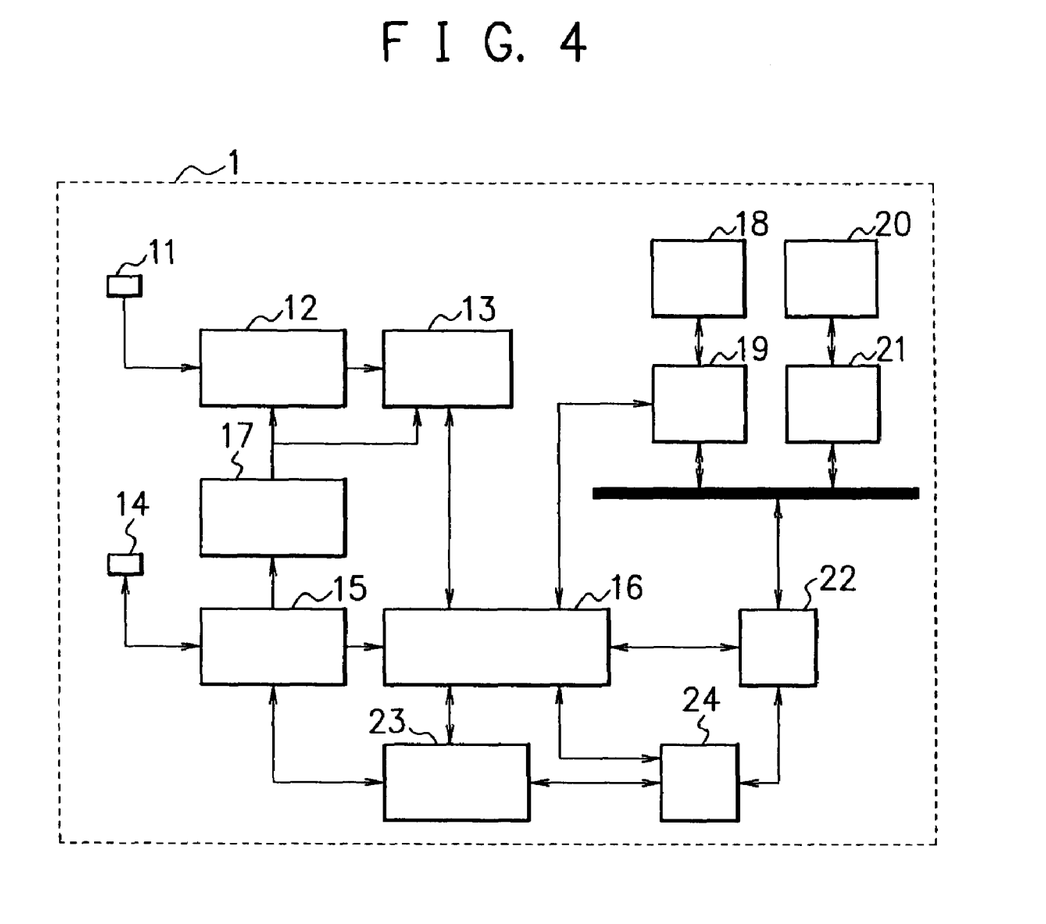
FIG. 4 is a block diagram showing the configuration of a GPS mobile phone unit utilizing a positioning function according to an embodiment of the present invention.

FIG. 4 is a block diagram showing the configuration of the GPS mobile phone unit 1 utilizing a positioning function according to an embodiment of the present invention.

As can be seen in FIG. 4, the GPS mobile phone unit 1 comprises a GPS antenna 11 for receiving GPS signals, a GPS radio section 12 for demodulating GPS signals, a GPS decryption section 13 for decrypting GPS signals, a two-way transmission antenna 14 for transmitting/receiving radio signals of a mobile phone system, a mobile phone radio section 15 for modulating/demodulating radio signals, a system processing section 16 for converting mobile phone signals and GPS signals into signals compatible with the mobile phone unit 1 as well as converting signals used by the mobile phone unit 1 into mobile phone signals and GPS signals, a frequency supply block 17 for providing the GPS radio section 12 and the GPS decryption section 13 with necessary clock signals, a voice input/output section 18, a voice processing section 19, a display 20, a display processing section 21, a CPU 22 for executing overall processing, a real time clock (RTC) 24 for counting time information, and a counter 23 for comparing the real time clock 24 with the operation clock of the mobile phone radio section 15.

Incidentally, the GPS radio section 12 and the GPS decryption section 13 are well known in the art, and it is believed that a detailed description of their configurations is unnecessary. In addition, the frequency supply block 17 may be implemented without being controlled by signals from the mobile phone radio section 15.

Figure 5:
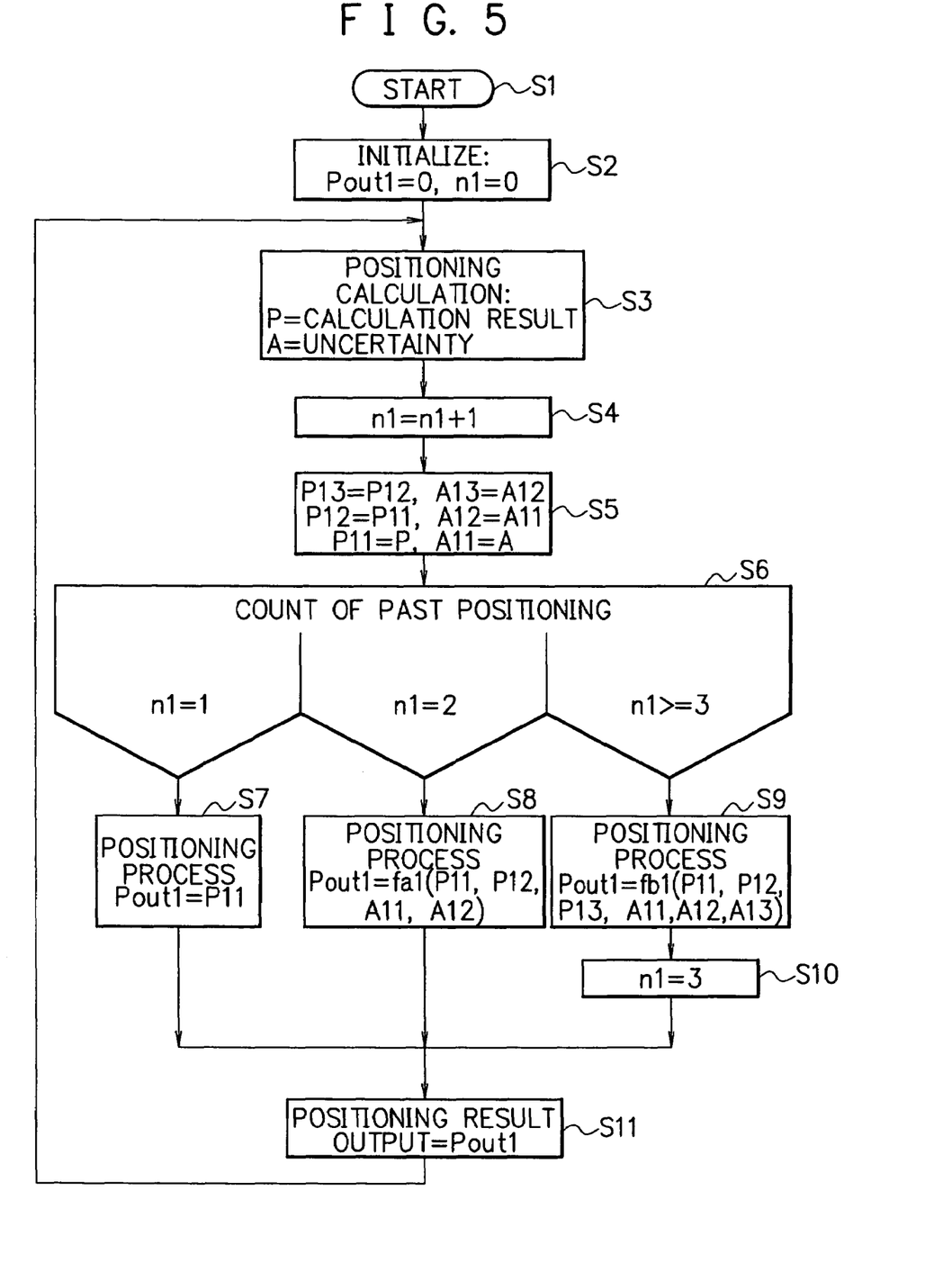
FIG. 5 is a flowchart showing the operation of the mobile phone system of FIG. 3 and the GPS mobile phone unit of FIG. 4 utilizing the positioning function for outputting a positioning result by the first process.

In the following, the operation of the mobile phone system shown in FIG. 3 and the GPS mobile phone unit 1 shown in FIG. 4 will be described with reference to FIG. 5. FIG. 5 is a flowchart showing the operation of the mobile phone system of FIG. 3 and the GPS mobile phone unit of FIG. 4 having the positioning function for obtaining a positioning result by the first process. The following description may be applied to both the single positioning method and the server assist method.

Referring to FIG. 5, having received a request to start positioning (step S1), the system processing section 16 initializes the output (positioning result Pout 1 obtained by the first process) and positioning calculation count (n1) (step S2).

Subsequently, the system processing section 16 receives GPS signals through the GPS antenna 11, the GPS radio section 12 and the GPS decryption section 13, and carries out a positioning calculation (step S3). There is uncertainty A (indeterminacy in positioning accuracy) as to each positioning calculation result P. The method for obtaining the positioning calculation result P and the uncertainty A is known as a GPS technique, and therefore requires any further explanation.

Next, the positioning calculation count n1 is incremented by 1 (step S4), and the least recent positioning calculation result is purged (shifted) in order from positioning calculation history (step S5). After that, the count of the past positioning calculation is determined (step S6).

At step S6, when the count of past positioning calculation is determined to be 1, the positioning calculation result P is directly output as the positioning result Pout 1 (step S7). When the count of past positioning calculation is determined to be 2, the respective positioning calculation results are weighted based on their uncertainties, and then averaged (step S8). Similarly, when the count of past positioning calculation is determined to be 3 or more, the positioning calculation results are weighted based on their uncertainties, respectively, and then averaged (step S9). In addition, when the positioning calculation has been carried out 3 times, the positioning calculation count n1 is reset to 3 in the last place (step S10). After the completion of steps 7 to 10, the operation returns to step S3.

Incidentally, while, in FIG. 5, a maximum of the three latest positioning data are used in the positioning process, the number of the past positioning data to be used for positioning can be set arbitrarily.

Figure 6:
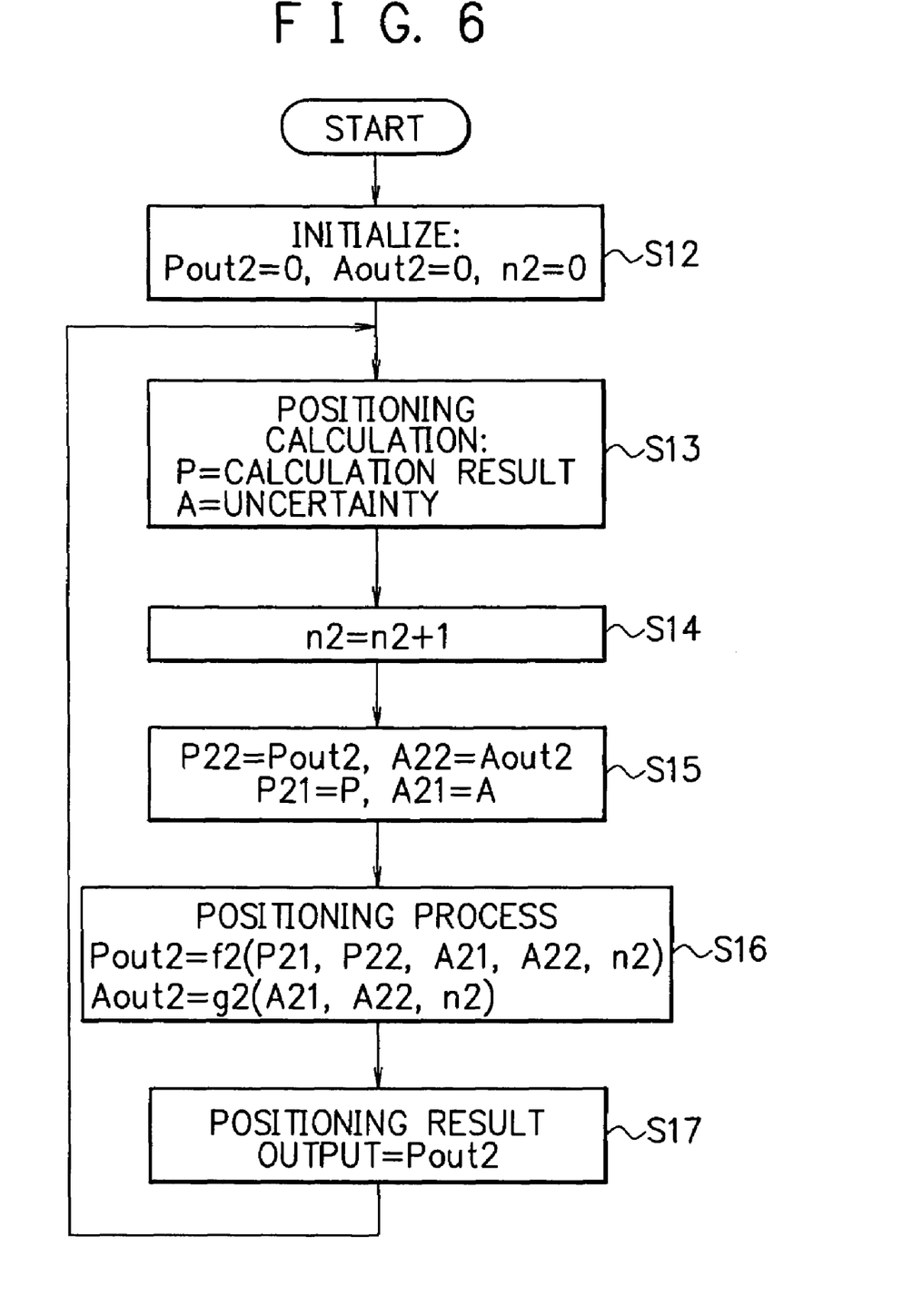
FIG. 6 is a flowchart showing the operation of the mobile phone system of FIG. 3 and the GPS mobile phone unit of FIG. 4 utilizing the positioning function for outputting a positioning result by the second process.

In the following, the other operation of the mobile phone system shown in FIG. 3 and the GPS mobile phone unit 1 shown in FIG. 4 will be described with reference to FIG. 6. FIG. 6 is a flowchart showing the operation of the mobile phone system and the GPS mobile phone unit having the positioning function for obtaining a positioning result by the second process. As in the case of the first process, the following description may be applied to both the single positioning method and the server assist method.

With reference to FIG. 6, having received a request to start the positioning process, the system processing section 16 initializes the output (positioning result Pout 2 obtained by the second process) and positioning calculation count (n2) in the same manner as with the first process (step S12).

Subsequently, the system processing section 16 receives GPS signals through the GPS antenna 11, the GPS radio section 12 and the GPS decryption section 13, and carries out a positioning calculation (step S13). There is uncertainty A (indeterminacy in positioning accuracy) as to each positioning calculation result P. The calculation for obtaining the positioning calculation result P and the uncertainty A is known as a GPS technique as descried previously for the first process in connection with FIG. 5.

Next, the positioning calculation count n2 is incremented by 1 (step S14), and, in positioning calculation history, the least recent positioning calculation results (P22 and A22) are substituted for or included in a positioning result Pout 2 and an uncertainty Aout 2 output by the second process (step S15). Accordingly, the past positioning calculation data will remain and can be reused.

After that, the positioning calculation result P (=P21) and the uncertainty A (=A21) are weighted based on the positioning result Pout (=P22) and Aout (=A22), which have been previously obtained by the second process, and the count of positioning calculation n2, and then averaged, respectively (step S16). The positioning result obtained by the second process in this manner replaces the last Pout 2 as a new Pout 2 (step S17).

Figure 7:
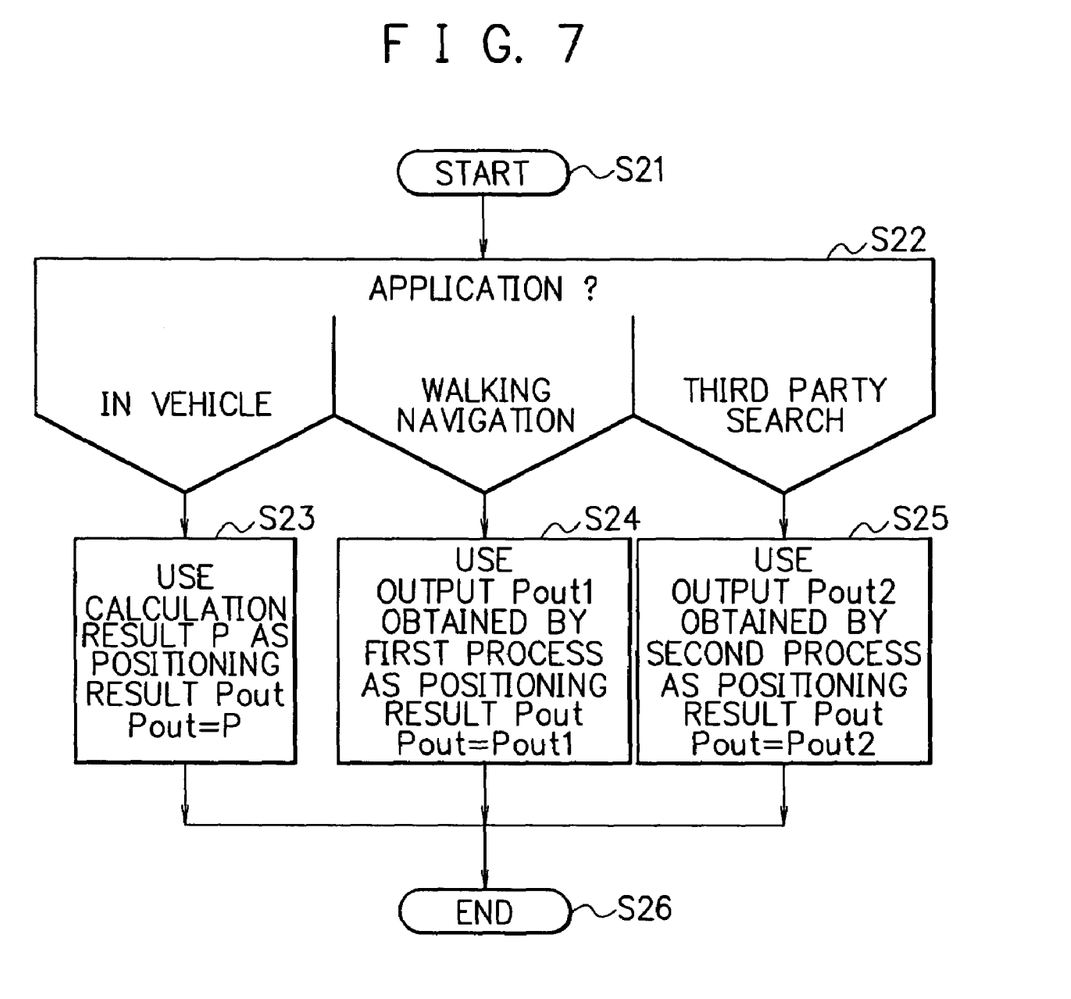
FIG. 7 is a flowchart showing operation for selectively using the results of the first process and the second process according to the first embodiment of the present invention.

The above-described first and second processes are selectively utilized depending on conditions. FIG. 7 is a flowchart showing operation for selectively using the results of the first process and the second process or not using both of them according to the first embodiment of the present invention. In the following, a description will be made of the operation with reference to FIG. 7.

When the operation is initiated (step S21), the system processing section 16 checks conditions to select one of processes used for positioning (step S22). That is, the system processing section 16 checks the application which is currently running on the GPS mobile phone unit 1. When the system processing section 16 determines that the application is for automobile use or being executed under the condition where the GPS mobile phone unit 1 is being used in a means of transport, such as an automobile and a train, which is traveling at a high speed, the positioning calculation result P is directly used as the positioning result Pout. In other words, both the first and second processes are not carried out (step S23).

At step S22, when the system processing section 16 determines that the application of, for example, walking navigation for providing routing assistance in real time, which is generally used in low-speed transit, is being executed on the GPS mobile phone unit 1, the first process is carried out for obtaining the positioning result (step S24).

At step S22, when the system processing section 16 determines that the application for receiving a location search request from a third-party is being executed on the GPS mobile phone unit 1, the second process is carried out for obtaining the positioning result (step S25). With the second process, in the case where the GPS mobile phone unit 1 is not traveling, variations or fluctuations in positioning calculation results are reduced.

In accordance with the first embodiment of the present invention as described above, it is possible to improve positioning accuracy. Generally, there are variations or fluctuations in positioning calculation results due to obstacles such as GPS satellites in transmission lines to transmit signals necessary for positioning calculations and delays caused by reflection. As a result, positioning accuracy cannot be secured. However, in the first embodiment of the present invention, each positioning calculation result and inaccuracy therein are weighted and averaged if needed. Thereby, improvement in positioning accuracy can be achieved. Thus, when an application in use is required of accuracy, it is possible to provide information with a higher degree of accuracy. Consequently, the level of service offered by the application can be enhanced.

Moreover, in accordance with the first embodiment of the present invention, costs can be reduced. In general, as measures to deal with variations or fluctuations, it is necessary to use high-precision components and enhance processing parts, as for example by increasing the scale of the gate of LSI, processing frequencies and processing memories. Such measures raise costs, and are undesirable for the mobile phone units with a high ratio of functional cost. However, in the first embodiment of the present invention, each positioning calculation result is weighted and averaged if needed so that improvement in positioning accuracy can be achieved. Thus, variations can be decreased without a cost rise.

Incidentally, in the above embodiment, when the system processing section 16 checks conditions to select one of processes used for positioning, the application which is currently running on the mobile phone unit is automatically identified. However, for example, the user of the mobile phone unit may input a condition or an application.

Figure 8:
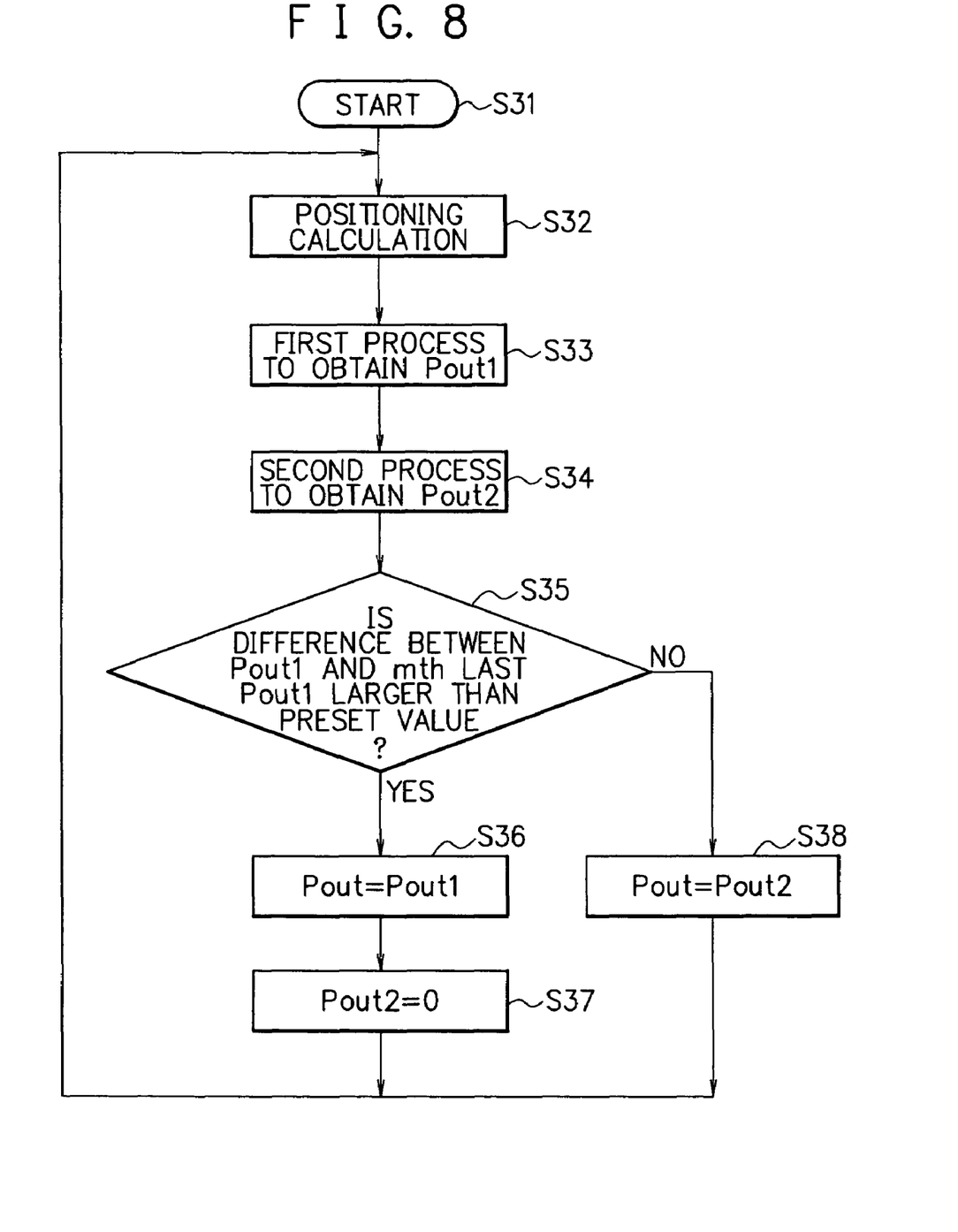
FIG. 8 is a flowchart showing operation for selectively using the results of the first process and the second process according to the second embodiment of the present invention.

FIG. 8 is a flowchart showing operation for selectively using the results of the first process and the second process or not using both of them according to the second embodiment of the present invention.

In FIG. 8, when the operation is initiated (step S31), a positioning calculation (step S32), the first process for averaging a plurality of positioning calculation results (step S33) and the second process for averaging a plurality of positioning calculation results (step S34) are carried out. These processes are performed in the same manner as described previously in connection with FIGS. 5 and 6.

Next, the positioning result obtained by the first process (Pout 1) is compared with the mth last positioning result (Pout 1) to determine whether or not the difference between the two is equal to or larger than a preset value (step S35). When the difference is equal to or larger than the preset value (step S35, YES), it is determined that the GPS mobile phone unit 1 is moving at a speed faster than a prescribed value, for example, at a speed of 10 kilometers per hour (km/h). In this case, the positioning result obtained by the first process is adopted (step S36), and the positioning result obtained by the second process (Pout 2) is deleted (step S37). On the other hand, when the difference is smaller than the preset value (step S35, NO), it is determined that the GPS mobile phone unit 1 is not traveling or traveling at a speed lower than the prescribed value. In this case, the positioning result obtained by the second process is adopted (step S38).

Figure 9:
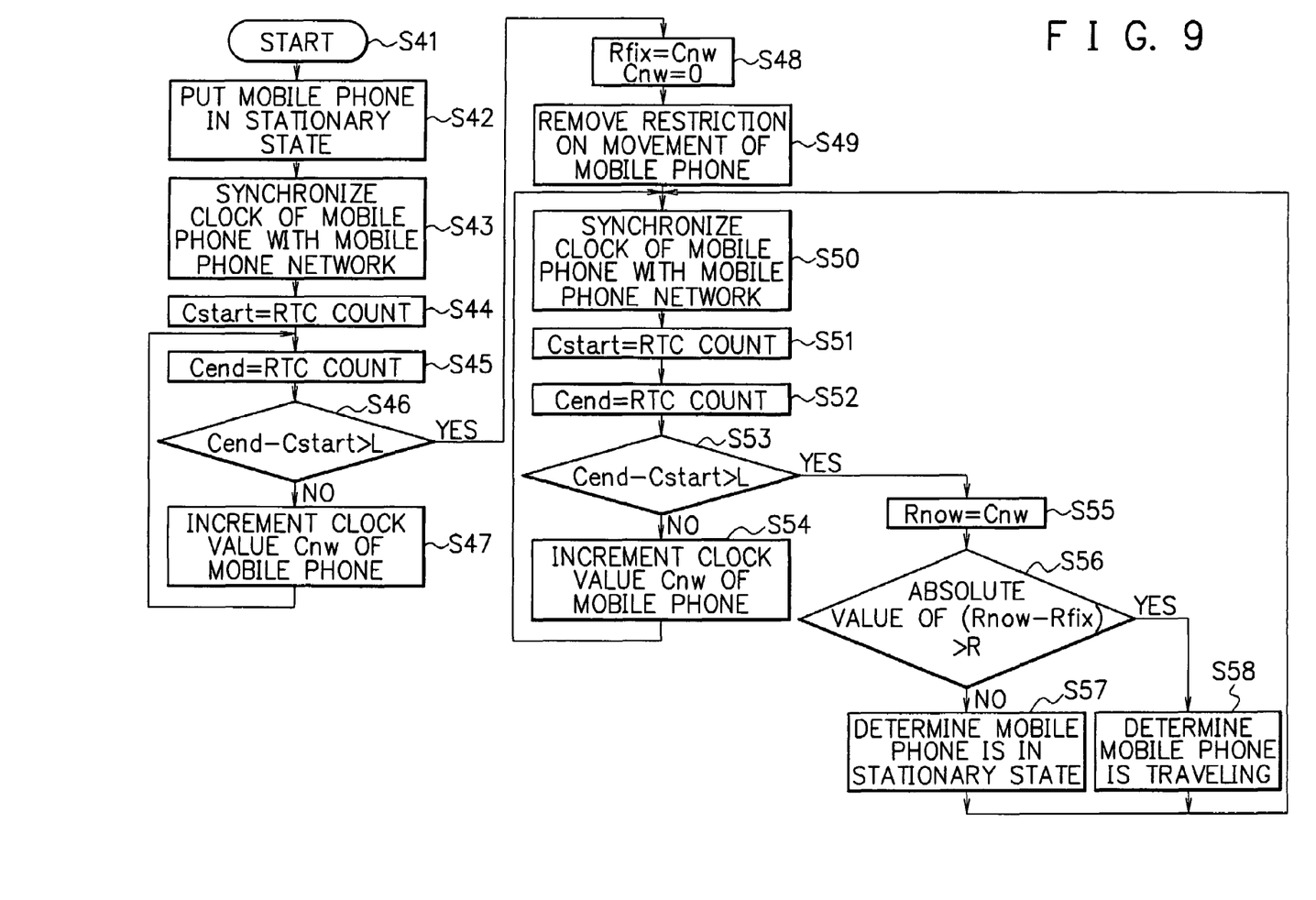
FIG. 9 is a flowchart showing the operation of the mobile phone system of FIG. 3 and the GPS mobile phone unit of FIG. 4 utilizing the positioning function for determining whether there is any motion of the GPS mobile phone unit.

In the following, a description will be made of the operation of the mobile phone system of FIG. 3 and the GPS mobile phone unit of FIG. 4 utilizing the positioning function for determining whether there is any motion of the GPS mobile phone unit. FIG. 9 is a flowchart showing the operation of the mobile phone system and the GPS mobile phone unit for determining whether there is any motion of the GPS mobile phone unit.

When the operation starts (step S41), for example, the user of the GPS mobile phone unit 1 comes to a halt so as to put the GPS mobile phone unit 1 in a stationary state (step S42). Subsequently, the GPS mobile phone unit 1 is connected to the mobile phone network 2, and is synchronized with the clock of the mobile phone network 2 (step S43). After that, the system processing section 16 reads in the count given by the RTC 24 twice (steps S44 and S45), and determines whether or not the difference between the two read counts (Cstart and Cend) is larger than a preset value L (step S46).

When the difference is equal to or smaller than the preset value L (step S46, NO), the system processing section 16 increments the clock value Cnw of the GPS mobile phone unit 1 (step S47), and the operation returns to step S45. The cycle of steps S45 to S47 is repeated until the difference between the counts Cstart and Cend reaches the preset value L.

When the difference between the counts Cstart and Cend has grown to the preset value L (step S46, YES), the system processing section 16 stores the clock value Cnw of the GPS mobile phone unit 1 as Rfix (step S48). The value of the Rfix is used as a reference value. After that, restrictions on the movement of the GPS mobile phone unit 1 is removed, namely, the stationary state of the GPS mobile phone unit 1 is ended, and the user can use the GPS mobile phone unit 1 normally (step S49). The clock of the GPS mobile phone unit 1 which has been synchronized with the clock of the mobile phone network 2 is always monitored from there on in the same manner as described previously for steps S43 to S47. That is, the GPS mobile phone unit 1 is connected to the mobile phone network 2, and is synchronized with the clock of the mobile phone network 2 (step S50). After that, the system processing section 16 reads in the count given by the RTC 24 twice (steps S51 and S52), and determines whether or not the difference between the two read counts (Cstart and Cend) is larger than the preset value L (step S53). When the difference is equal to or smaller than the preset value L (step S53, NO), the system processing section 16 increments the clock value Cnw of the GPS mobile phone unit 1 (step S54), and the operation returns to step S50.

In the case where the difference between the counts Cstart and Cend is larger than the preset value L (step S53, YES), the system processing section 16 stores the clock value Cnw of the GPS mobile phone unit 1 as Rnow (step S55).

While the mobile phone network 2 is fixed and does not move, the GPS mobile phone unit 1 is carried around. Consequently, even if the clock of the GPS mobile phone unit 1 has been synchronized with the clock of the mobile phone network 2, the clock of the GPS mobile phone unit 1 deviates from the clock of the mobile phone network 2 in proportion to the speed of travel due to the Doppler effect. In order to monitor the deviation, the count value Rnow which is always updated is compared with the preset reference count value Rfix to determine whether or not the difference between the two (Rnow and Rfix) is larger than the preset value R (step S56).

When the difference between the count value Rnow and the reference count value Rfix is larger than the preset value R (step S56, YES), it is determined that the GPS mobile phone unit 1 is traveling (step S58). On the other hand, when the difference is equal to or smaller than the preset value R (step S56, NO), it is determined that the GPS mobile phone unit 1 is not traveling (step S57).

Figure 10:
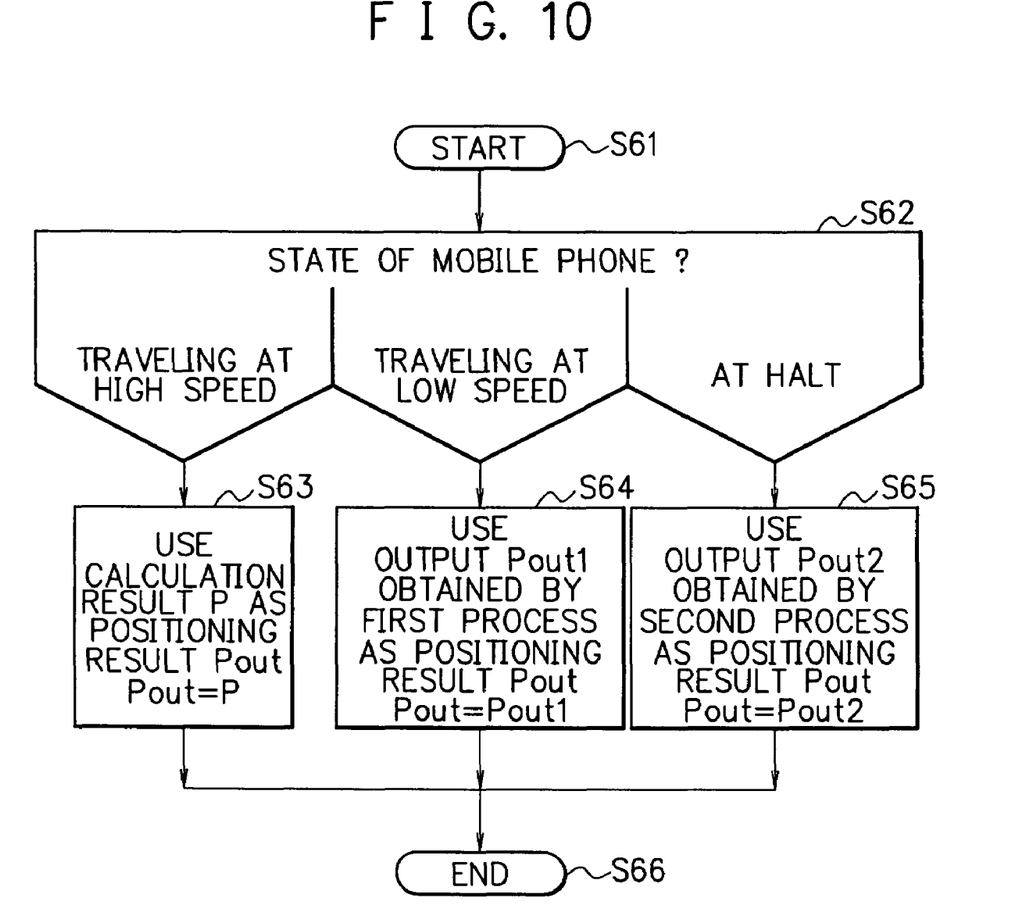
FIG. 10 is a flowchart showing operation for selectively using the results of the first process and the second process according to the third embodiment of the present invention.

FIG. 10 is a flowchart showing operation for selectively using the results of the first process and the second process or not using both of them according to the third embodiment of the present invention. Referring to FIG. 10, a description will be made of the operation of selecting either of the first process and the second process or not selecting both of them based on the state of the GPS mobile phone unit 1 determined by the operation shown in FIG. 9.

When the operation starts (step S61), the system processing section 16 checks the state of the GPS mobile phone unit 1 (step S62). When it has been determined at step S62 that the GPS mobile phone unit 1 is moving at a high speed, the positioning calculation result P is directly used as the positioning result Pout (step S63). In other words, neither the first process nor the second process is performed.

When it has been determined at step S62 that the GPS mobile phone unit 1 can be moving at a relatively low speed, the first process is performed to obtain the positioning result Pout (step S64). Besides, when it has been determined at step S62 that the GPS mobile phone unit 1 is staying in the same location, the second process is carried out to obtain the positioning result Pout (step S65).

Figure 11:
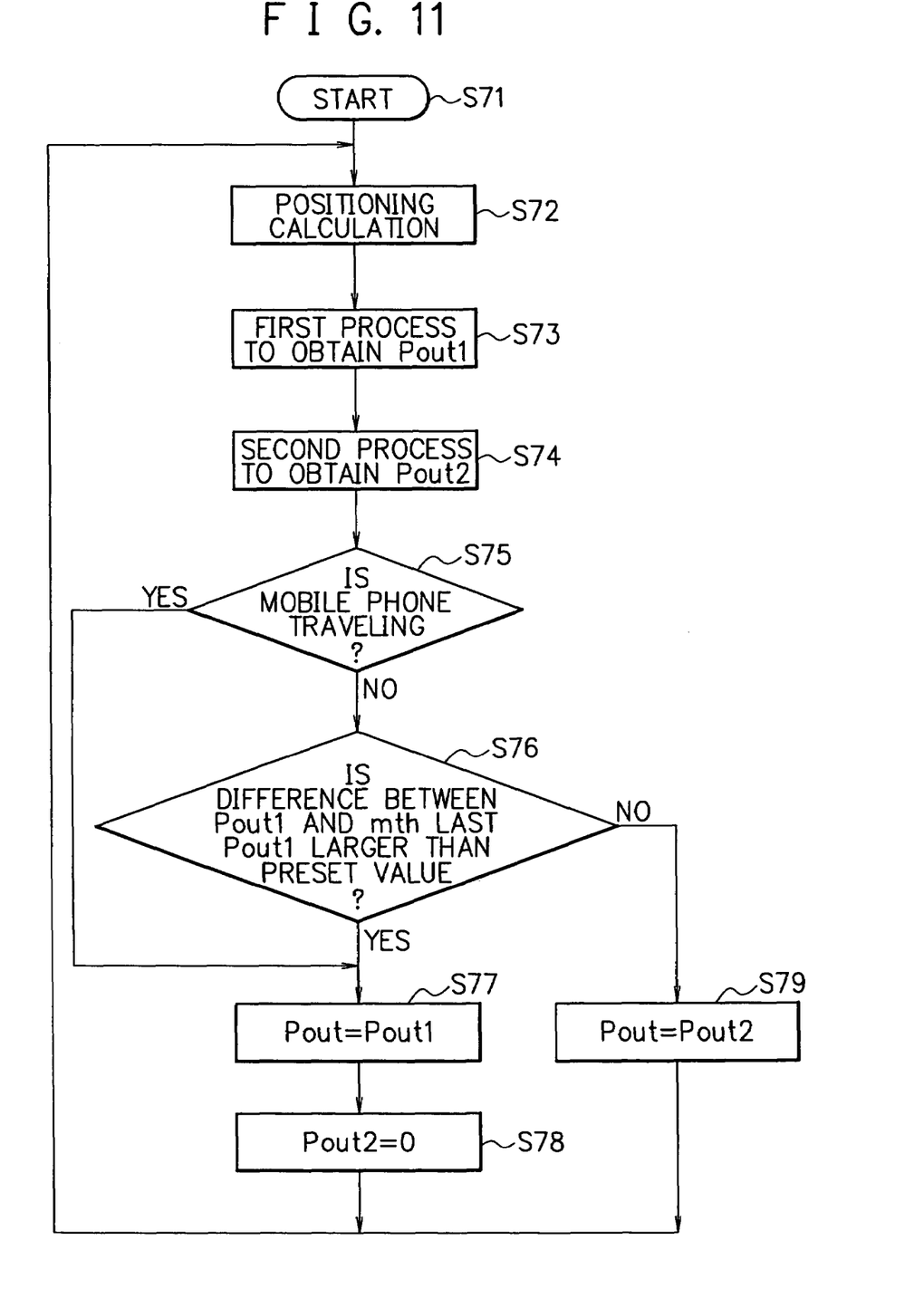
FIG. 11 is a flowchart showing operation for selectively using the results of the first process and the second process according to the fourth embodiment of the present invention.

FIG. 11 is a flowchart showing operation for selectively using the results of the first process and the second process or not using both of them according to the fourth embodiment of the present invention. Referring to FIG. 11, a description will be made of the operation of selecting either of the first process and the second process or not selecting both of them based on the state of the GPS mobile phone unit 1 determined by the operation shown in FIG. 9.

When the operation is initiated (step S71), a positioning calculation (step S72), the first process for averaging a plurality of positioning calculation results (step S73) and the second process for averaging a plurality of positioning calculation results (step S74) are carried out. These processes are performed in the same manner as described previously in connection with FIGS. 5 and 6.

Next, it is determined whether or not the GPS mobile phone unit 1 is traveling by the operation shown in FIG. 7 (step S75). Since the GPS mobile phone unit 1 can be moving in the same location, the system processing section 16 may judge the mobile phone unit 1 to be in a stationary state while it is actually traveling at a low speed. Therefore, in the case where it has been determined that the GPS mobile phone unit 1 is not traveling (step S75, NO), the averaged positioning result obtained by the first process (Pout 1) is compared with the mth last positioning result (Pout 1) to determine whether or not the GPS mobile phone unit 1 is moving at a speed faster than a prescribed value, for example, at a speed of 10 km/h (step S76).

In the case where the GPS mobile phone unit 1 is moving at a speed faster than a prescribed value (step S76, YES), the averaged positioning result obtained by the first process is adopted (step S77), and the averaged positioning result obtained by the second process (Pout 2) is deleted (step S78).

On the other hand, when it has been determined that the GPS mobile phone unit 1 is not traveling or traveling at a speed lower than a prescribed value (step S76, NO), the system processing section 16 adopts the positioning result obtained by the second process (step S79).

With this construction, the selection of the calculation process is not specified according to applications, but is carried out while monitoring the state of the mobile phone unit. Thus, it is possible to provide a positioning result with a higher degree of accuracy.

As set forth hereinbefore, in accordance with the present invention, a mobile terminal has a positioning function for implementing positioning with plural processes and is capable of selecting an optimum process by which positioning can be executed with the least error in positioning accuracy.

Moreover, it is possible to provide a positioning result with a higher degree of accuracy at a low price.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A positioning method for a mobile terminal having a positioning function, wherein a positioning result is obtained by selectively using:
   data obtained by a positioning calculation;
   data obtained by a first calculation process for finding out a weighted average value from the results of two or more latest positioning calculations based on a plurality of positioning calculations; or
   data obtained by a second calculation process for finding out a weighted average value by adding the result of the latest positioning calculation as a calculation factor to the weighted average of past positioning calculation results based on a plurality of positioning calculations,
   the method further comprising:
   determining, based on a current condition of the mobile terminal, which data to be input to the positioning function to determine the positioning result; and
   determining the positioning result using the positioning function and the data determined to be input to the positioning function; and
   displaying the positioning result of the mobile terminal that corresponds to a current position of the mobile terminal.

2. The positioning method claimed in claim 1, wherein positioning is continued based on a decision as to whether or not to change the calculation process when the traveling speed of the mobile terminal has changed after selecting one of the data.

3. The positioning method claimed in claim 1, wherein positioning is started with the initialization process.

4. A positioning method for a mobile terminal having a positioning function, wherein a positioning result is obtained by selectively using:
   data obtained by a positioning calculation;
   data obtained by a first calculation process for finding out a weighted average value from the results of two or more latest positioning calculations based on a plurality of positioning calculations; or
   data obtained by a second calculation process for finding out a weighted average value by adding the result of the latest positioning calculation as a calculation factor to the weighted average of past positioning calculation results based on a plurality of positioning calculations;
   wherein one of the data is selected based on an application running on the mobile terminal,
   the method further comprising:
   determining the positioning result using the positioning function and the data that is selected based on the application running on the mobile terminal; and
   displaying the positioning result of the mobile terminal that corresponds to a current position of the mobile terminal.

5. The positioning method claimed in claim 4, wherein positioning is continued based on a decision as to whether or not to change the calculation process when the traveling speed of the mobile terminal has changed after selecting one of the data.

6. A positioning method for a mobile terminal having a positioning function, wherein a positioning result is obtained by selectively using:
   data obtained by a positioning calculation;
   data obtained by a first calculation process for finding out a weighted average value from the results of two or more latest positioning calculations based on a plurality of positioning calculations; or
   data obtained by a second calculation process for finding out a weighted average value by adding the result of the latest positioning calculation as a calculation factor to the weighted average of past positioning calculation results based on a plurality of positioning calculations;
   wherein one of the data is selected based on the traveling speed of the mobile terminal,
   the method further comprising:
   determining the positioning result using the positioning function and the data that is selected based on the traveling speed of the mobile terminal; and
   displaying the positioning result of the mobile terminal that corresponds to a current position of the mobile terminal.

7. The positioning method claimed in claim 6, wherein positioning is continued based on a decision as to whether or not to change the calculation process when the traveling speed of the mobile terminal has changed after selecting one of the data.

8. A positioning method for a mobile terminal having a positioning function, wherein a positioning result is obtained by selectively using:
   data obtained by a positioning calculation;
   data obtained by a first calculation process for finding out a weighted average value from the results of two or more latest positioning calculations based on a plurality of positioning calculations; or
   data obtained by a second calculation process for finding out a weighted average value by adding the result of the latest positioning calculation as a calculation factor to the weighted average of past positioning calculation results based on a plurality of positioning calculations;
   wherein one of the data is selected based on the state of the mobile terminal determined by comparing the clock speed of a fixed position with the clock speed of the mobile terminal, the method further comprising:
determining the positioning result using the positioning function and the data that is selected based on the state of the mobile terminal; and
displaying the positioning result of the mobile terminal that corresponds to a current position of the mobile terminal.

9. The positioning method claimed in claim 8, wherein positioning operation is continued based on a decision as to whether or not to change the calculation process when the traveling speed of the mobile terminal has changed after selecting one of the data.

10. A mobile terminal with a positioning function, which obtains a positioning result by selectively using:
data obtained by a positioning calculation;
data obtained by a first calculation process for finding out a weighted average value from the results of two or more latest positioning calculations based on a plurality of positioning calculations; or
data obtained by a second calculation process for finding out a weighted average value by adding the result of the latest positioning calculation as a calculation factor to the weighted average of past positioning calculation results based on a plurality of positioning calculations,
the mobile terminal further comprising:
a determining unit configured to determine, based on a current condition of the mobile terminal, which data to input to the positioning function to determine the positioning result; and
a display unit configured to display the positioning result of the mobile terminal that corresponds to a current position of the mobile terminal.

11. A mobile terminal with a positioning function, which obtains a positioning result by selectively using:
data obtained by a positioning calculation;
data obtained by a first calculation process for finding out a weighted average value from the results of two or more latest positioning calculations based on a plurality of positioning calculations; or
data obtained by a second calculation process for finding out a weighted average value by adding the result of the latest positioning calculation as a calculation factor to the weighted average of past positioning calculation results based on a plurality of positioning calculations;
wherein one of the data is selected based on an application running on the mobile terminal,
the mobile terminal further comprising:
a determining unit configured to determine the positioning result using the positioning function and the data that is selected based on the application running on the mobile terminal; and
a display unit configured to display the positioning result of the mobile terminal that corresponds to a current position of the mobile terminal.

12. A mobile terminal with a positioning function, which obtains a positioning result by selectively using:
data obtained by a positioning calculation;
data obtained by a first calculation process for finding out a weighted average value from the results of two or more latest positioning calculations based on a plurality of positioning calculations; or
data obtained by a second calculation process for finding out a weighted average value by adding the result of the latest positioning calculation as a calculation factor to the weighted average of past positioning calculation results based on a plurality of positioning calculations;
wherein one of the data is selected based on the traveling speed of the mobile terminal,
the mobile terminal further comprising:
a determining unit configured to determine the positioning result using the positioning function and the data that is selected based on the traveling speed of the mobile terminal; and
a display unit configured to display the positioning result of the mobile terminal that corresponds to a current position of the mobile terminal.

13. A mobile terminal with a positioning function, comprising a first clock, a second clock and a counter for determining the state and/or traveling speed of the mobile terminal, which obtains a positioning result by selectively using:
data obtained by a positioning calculation;
data obtained by a first calculation process for finding out a weighted average value from the results of two or more latest positioning calculations based on a plurality of positioning calculations; or
data obtained by a second calculation process for finding out a weighted average value by adding the result of the latest positioning calculation as a calculation factor to the weighted average of past positioning calculation results based on a plurality of positioning calculations;
wherein one of the data is selected based on the state and/or traveling speed of the mobile terminal determined from the difference between a first clock value and a second clock value obtained by the first clock, the second clock and the counter,
the mobile terminal further comprising:
a determining unit configured to determine the positioning result using the positioning function and the data that is selected based on the state and/or traveling speed of the mobile terminal; and
a display unit configured to display the positioning result of the mobile terminal that corresponds to a current position of the mobile terminal.

14. The mobile terminal claimed in claim 13, wherein the first clock value is determined based on a clock pulse that occurs at a fixed position.

15. The mobile terminal claimed in claim 13, wherein the first clock value is determined based on a clock pulse generated by the clock of a mobile terminal network.

16. A positioning system comprising:
a mobile terminal with a positioning function, which obtains a positioning result by selectively using:
data obtained by a positioning calculation:
data obtained by a first calculation process for finding out a weighted average value from the results of two or more latest positioning calculations based on a plurality of positioning calculations; or
data obtained by a second calculation process for finding out a weighted average value by adding the result of the latest positioning calculation as a calculation factor to the weighted average of past positioning calculation results based on a plurality of positioning calculations;
a plurality of signal sources for providing the mobile terminal with signals used to carry out positioning calculations; and
a reference clock source for providing the mobile terminal with a clock signal used to determine the state and/or traveling speed of the mobile terminal;
wherein the mobile terminal determine the state and/or traveling speed of the mobile terminal using a reference clock value which has been determined based on the clock signal fed by the reference clock source, and selects one of calculation processes to obtain a positioning result based on the state and/or traveling speed of the mobile terminal.

17. The positioning system claimed in claim 16, wherein the plurality of signal sources are GPS satellites.

18. The positioning system claimed in claim 16, wherein the signals for carrying out positioning calculations are signals transmitted and received by the mobile terminal in a mobile terminal network.

19. The positioning system claimed in claim 16, wherein:
the plurality of signal sources are GPS satellites; and
the reference clock source generates clock signals in a fixed position.

20. The positioning system claimed in claim 16, wherein:
the signals for carrying out positioning calculations are signals transmitted and received by the mobile terminal in a mobile terminal network; and
the reference clock source generates clock signals in a fixed position.

* * * * *